United States Patent
Morrison et al.

(10) Patent No.: US 8,844,847 B2
(45) Date of Patent: Sep. 30, 2014

(54) PROCESSING APPARATUS AND METHODS

(75) Inventors: Michael Joseph Morrison, Victoria (AU); Axel Guenther Andre, Victoria (AU)

(73) Assignee: Advanced Grinding Technologies Pty Ltd, Melbourne, Victoria (AU)

( * ) Notice: Subject to any disclaimer, the term of this patent is extended or adjusted under 35 U.S.C. 154(b) by 0 days.

(21) Appl. No.: 13/458,049

(22) Filed: Apr. 27, 2012

(65) Prior Publication Data

US 2013/0081302 A1 Apr. 4, 2013

Related U.S. Application Data (63) Continuation of application No. 10/586,194, filed on Feb. 24, 2009, now abandoned.

(30) Foreign Application Priority Data

Jan. 16, 2004 (AU) .............................. 20044900217

(51) Int. Cl.
*B02C 19/06* (2006.01)
*B02C 13/09* (2006.01)
(Continued)

(52) U.S. Cl.
CPC .............. *F26B 5/00* (2013.01); *B01F 13/1041* (2013.01); *B01F 13/1011* (2013.01); *B02C 17/007* (2013.01); *B01F 5/104* (2013.01); *B01D 21/06* (2013.01); *B02C 17/16* (2013.01); *B01F 15/00987* (2013.01); *C02F 2301/026* (2013.01); *B01F 7/285* (2013.01); *B01F 2215/0014* (2013.01); *B01F 2215/0481* (2013.01); *C02F 2301/024* (2013.01); *B01F 15/00974* (2013.01); *B01D 21/245* (2013.01); *F26B 17/107* (2013.01); *F26B 17/24* (2013.01); *B01D 21/2444* (2013.01); *B01F 2215/0032* (2013.01); *B02C 17/163* (2013.01); *B01D 21/267* (2013.01); *B01F 7/1625* (2013.01); *B01F 2215/005* (2013.01); *B01F 7/18* (2013.01); *C02F 2103/08* (2013.01); *B09B 3/00* (2013.01); *B01D 21/26* (2013.01); *C02F 1/38* (2013.01)
USPC .............................. 241/5; 241/189.1; 241/277

(58) Field of Classification Search
USPC ........... 241/5, 30, 80, 189.1, 275, 277, 285.1, 241/57
See application file for complete search history.

(56) References Cited

U.S. PATENT DOCUMENTS 1,636,033 A * 7/1927 Agnew ........................ 241/188.1
2,012,694 A * 8/1935 Runyan ........................... 241/38
(Continued)

FOREIGN PATENT DOCUMENTS

AU 1500297 A1 9/1997
AU 1954000 A1 9/2000
(Continued)

OTHER PUBLICATIONS

International Search Report of PCT/AU2005/000037 dated Feb. 25, 2005.
(Continued)

*Primary Examiner* — Faye Francis
(74) *Attorney, Agent, or Firm* — Amster, Rothstein & Ebenstein LLP (57) ABSTRACT

A feed material processing apparatus including a chamber; at least one inlet in flow communication to an upper region of the chamber; a rotor located within the chamber that is rotatable about a substantially vertical axis by a rotation drive, wherein the rotor promotes a circulatory flow of feed material and/or gas within the chamber; at least one outlet in flow communication from a lower region of the chamber. Preferably the apparatus comprises at least one feature located laterally on the rotor to promote the circulatory flow.

19 Claims, 6 Drawing Sheets

(51) Int. Cl.
*B02C 1/08* (2006.01)
*B01F 13/10* (2006.01)
*B02C 17/00* (2006.01)
*B01F 5/10* (2006.01)
*B01D 21/06* (2006.01)
*B02C 17/16* (2006.01)
*B01F 15/00* (2006.01)
*B01F 7/28* (2006.01)
*B01D 21/24* (2006.01)
*F26B 17/10* (2006.01)
*F26B 17/24* (2006.01)
*B01F 7/16* (2006.01)
*F26B 5/00* (2006.01)
*B01F 7/18* (2006.01)
*B09B 3/00* (2006.01)
*C02F 1/38* (2006.01)
*B01D 21/26* (2006.01)
*C02F 103/08* (2006.01)

(56) References Cited

U.S. PATENT DOCUMENTS

| | | | |
|---|---|---|---|
| 2,474,314 A * | 6/1949 | Koehne | 241/4 |
| 2,592,994 A * | 4/1952 | Ahlmann | 241/26 |
| 2,656,988 A * | 10/1953 | Smith | 241/275 |
| 3,567,141 A * | 3/1971 | Zbraniborski et al. | 241/48 |
| 3,799,455 A | 3/1974 | Szegvari | |
| 3,944,144 A | 3/1976 | Okada et al. | |
| 4,376,515 A * | 3/1983 | Soe | 241/101.8 |
| 4,650,343 A | 3/1987 | Doom | |
| 4,799,595 A | 1/1989 | Binder | |
| 4,979,686 A | 12/1990 | Szegvari et al. | |
| 5,366,170 A * | 11/1994 | Jones et al. | 241/275 |
| 5,381,974 A * | 1/1995 | Gygi | 241/188.1 |
| 5,538,342 A | 7/1996 | Aoshima | |
| 5,732,894 A * | 3/1998 | Sheahan | 241/56 |
| 5,941,467 A * | 8/1999 | McArdle et al. | 241/5 |
| 6,923,391 B1 * | 8/2005 | Gibson | 241/5 |
| 2002/0064086 A1 | 5/2002 | Mori | |
| 2003/0197080 A1 | 10/2003 | Karkos | |
| 2004/0218465 A1 | 11/2004 | Arribau | |

FOREIGN PATENT DOCUMENTS

| | | |
|---|---|---|
| DE | 3002429 A1 | 7/1981 |
| DE | 3916258 A1 | 11/1990 |
| DE | 20215158 U1 | 10/2003 |
| DE | 10308500 A1 | 9/2004 |
| EP | 0217977 A2 | 4/1887 |
| EP | 1208905 A2 | 5/2002 |
| EP | 1273341 A2 | 1/2003 |
| JP | 09066243 | 3/1997 |
| JP | 2002035562 | 2/2002 |
| JP | 2002059144 | 2/2002 |
| JP | 2002282723 | 10/2002 |
| JP | 2003093909 | 4/2003 |
| RU | 2066111 C1 | 9/1996 |
| RU | 2108160 C1 | 4/1998 |
| RU | 2207901 C2 | 7/2003 |
| WO | 2004041442 A1 | 5/2004 |
| WO | 2004067468 A1 | 8/2004 |
| WO | 2004091797 A1 | 10/2004 |

OTHER PUBLICATIONS

International Preliminary Report of Patentability of PCT/AU2005/000037 dated Jan. 13, 2006.
European Search Report of Corresponding European Application No. EP 05700069-7 dated Jul. 7, 2011.

* cited by examiner

PROCESSING APPARATUS AND METHODS

RELATED APPLICATIONS

This application is a continuation of U.S. application Ser. No. 10/586,194, filed Feb. 24, 2009, the contents of which are incorporated herein by reference in their entirety.

TECHNICAL FIELD

The present invention relates to processing apparatus and methods and in particular, but not exclusively, the invention relates to an apparatus that may be used to process a wide variety of feed materials by one or more of milling or grinding, mixing, blending, separation, drying and sterilisation. The invention specifically relates to particular processes that may be adopted in the processing of specified feed materials.

BACKGROUND OF INVENTION

There are a broad range of situations in which feed materials must be processed in manners resulting in their milling or grinding (terms used herein interchangeably), mixing, blending, separation, drying and sterilisation. For example, many production processes require the use of ground, mixed, blended, dried or sterilised ingredient materials and indeed in recent times it has been recognised that physical characteristics of materials may be advantageous or may in fact alter once the materials are processed to a micro- or nano-particulate diameter. For example solubility, emulsification, colloid forming, light defraction or reflection and absorption properties of materials may be advantageous if the materials are processed to a fine particulate form. For example, the use of a fine particulate form of zinc oxide allows the preparation of transparent zinc oxide containing sun protection creams and fine particulate forms of pharmaceutical agents may exhibit modified pharmacokinetic characteristics such as allowing dermal penetration or more rapid absorption across the gastrointestinal tract.

It is also a focus in this era of increasing environmental concern to minimise the negative environmental impact of industrial and agricultural processes and it has now been demonstrated that processing of feed materials by milling, mixing, blending, separating, drying and sterilisation may provide opportunities to produce useful products or materials from waste materials that would otherwise have been discarded, burned or buried with the potential for a negative environmental impact. Adoption of processes such as these that result in what otherwise would be considered as waste materials having some economic value are likely to encourage commercial entities to be more responsible with their waste materials.

Not only may milling, mixing, blending, separation, drying and sterilisation processes be of potential utility in waste management and production of fine particulate materials, but such processes may also be useful in the production of powdered foodstuffs, food ingredients or nutritional supplements, production of cosmetics, toiletries and pharmaceuticals, recycling of various materials, paint and dye-stuff manufacture, mineral refining and a broad range of other applications.

Commonly, processes for grinding or milling materials will also produce other process outcomes such as drying and separation, and if more than one feed material is involved, additional outcomes such as mixing and blending may result.

A known form of processing by grinding involves use of a high velocity fluid, particularly air, in a fluid jet pulverising mill (which may also be known as a fluid energy mill) or an anvil mill, wherein particles of a feed material are typically entrained in a vortex of the airstream within a grinding chamber. Highly pressurised air is supplied into the grinding chamber so as to form the vortex and the grinding of particles of feed material is effected by the action of the airstream on the particles and by abrasive contact of the particles with one another and with the sides of the grinding chamber or anvils disposed therein.

In fluid energy or jet mills the autogenous pulverisation of particles is driven by the supplied highly pressurised (that is, compressed) gas or air, and such mills are thus distinguished from hammer mills in which the pulverisation occurs by means of high speed rotating pulverising elements or hammers. Thus fluid energy mills, in contrast to hammer mills, do not include any moving parts. They do, however, involve significantly higher operating expense than hammer mills as the supply of compressed air or gas is a highly expensive medium for supply of energy. Fluid energy mills are also characterised by high capital costs associated with, for example, the required gas compressors, as well as high running and maintenance costs and a relatively low efficiency of utilisation of the compressed gas to effect pulverisation. Known fluid energy mills are typically in the range of ten times more expensive than hammer mills with respect to the cost of ground product. Consequently the milling of only high value specialty products can justify the costs of utilising a fluid energy mill. The milling in fluid energy mills of commodity products such as coal, cement, minerals, building materials, recycled materials, biomass or waste from food manufacture or other industrial processes generally cannot be conducted at an economically viable cost.

An example of a fluid milling apparatus is disclosed in international patent publication WO 00/56460 that relates to a device comprising an upper annular chamber into which feed material is introduced, and a lower conical chamber. A high velocity vortex flow of compressed air is introduced into the chamber, which gives rise to milling and drying of a feed material.

The present inventors have now devised a processing apparatus and methods for processing feed materials that may offer certain advantages relative to earlier apparatus and methods, such as reduced capital and operating costs and increased processing efficiency.

SUMMARY OF INVENTION

According to a preferred embodiment of the present invention there is provided a feed material processing apparatus comprising:
  a chamber;
  at least one inlet in flow communication to an upper region of the chamber;
  a rotor located within the chamber that is rotatable about a substantially vertical axis by a rotation drive, wherein the rotor promotes a circulatory flow of feed material and/or gas within the chamber;
  at least one outlet in flow communication from a lower region of the chamber.

Preferably the apparatus comprises at least one feature located laterally on the rotor to promote the circulatory flow.

In a preferred embodiment of the invention the chamber has a substantially circular shape through its horizontal cross section. Preferably the rotor has a substantially circular gross shape through its horizontal cross section and most preferably the rotor is substantially cylindrical in gross shape. Preferably diameter of the chamber narrows towards a base thereof. Preferably the narrowing of the chamber results from angled side walls of the chamber.

In another embodiment a region of narrowed diameter is provided within the chamber towards a base thereof. Preferably the region of narrowed diameter results from presence of one or more screens or ledges within the chamber.

In another embodiment of the invention sides of the rotor are angled.

In further embodiments the chamber comprises either a substantially flat roof or a domed roof.

In a further embodiment of the invention an upper surface of the rotor is domed.

In a further embodiment of the invention an upper edge of the rotor and/or of the features located laterally on the rotor is/are bevelled.

In a still further embodiment an upper edge of the rotor and/or of the features located laterally on the rotor is/are formed from or coated with wear resistant material. Preferably the wear resistant material is selected from hardened steel, carbon tungsten, zirconia and diamond.

In another embodiment diameter of the chamber increases at a base thereof.

In a still further embodiment one or more surfaces of the chamber, the rotor and/or the features located laterally on the rotor (preferably an upper surface of the rotor) is/are coated with non-stick material. Preferably the non-stick material is selected from non-stick polymer, Teflon™ and titanium compounds.

In a further aspect of the invention the apparatus comprises outlets at varying vertical positions of the chamber to allow removal from the chamber of feed material particles of graded size or mass.

In another embodiment of the invention the apparatus comprises at least one recirculation circuit between an outlet and an inlet to allow return of feed material from a lower region to an upper region of the chamber.

In another embodiment of the invention the at least one inlet comprises a closure and/or a variable aperture. In a further embodiment of the invention the at least one outlet comprises a closure and/or a variable aperture.

In a still further embodiment of the invention the apparatus comprises a ledge, shelf or screen within the chamber adjacent to the at least one outlet to direct feed material particles to the outlet and/or to promote grading of feed material particle size or mass.

In a further embodiment of the invention the apparatus comprises a ledge or shelf within the chamber in association with the at least one inlet, onto which feed material can initially be directed.

In a preferred embodiment of the invention the at least one feature on a lateral surface of the rotor comprises at least one projection and/or depression. In one embodiment of the invention the at least one depression comprises at least one substantially vertical groove or trough.

In another embodiment the at least one projection comprises at least one spike and/or nodule. Preferably a plurality of spikes and/or nodules form at least one substantially vertical row of spikes and/or nodules. In a particularly preferred embodiment of the invention the at least one projection comprises at least one substantially vertical bar or blade.

According to a still further embodiment of the invention the distance between the rotor and side walls of the chamber is substantially consistent along the rotor. In another embodiment distance between the rotor and side walls of the chamber decreases towards a base of the chamber.

According to a still further embodiment of the present invention the apparatus comprises at least one projection on an upper and/or lower surface of the rotor. In one embodiment the projection on the upper or lower surface of the rotor is at least one spike and/or nodule and preferably a plurality of spikes and/or nodules form at least one row radiating from a centre to a periphery of the upper and/or lower surface.

In a preferred embodiment of the invention the at least one projection on the upper or lower surface of the rotor comprises at least one bar or blade radiating from a centre to a periphery of the upper and/or lower surface.

In a preferred embodiment of the invention the rotation drive comprises a motor driveably engaged to a drive shaft that is in turn drivably engaged to the rotor through a substantially central vertical axis thereof. In a further embodiment the apparatus comprises a positive pressure scroll within the chamber in association with the drive shaft to substantially preventing ingress of feed material to drive shaft associated bearings.

Preferably the motor is a variable speed electric motor.

In one embodiment of the invention the drive shaft enters the chamber from above. In another embodiment the drive shaft enters the chamber from below, and in this case an inlet is preferably located substantially centrally within a roof of the chamber. Preferably an upper surface of the rotor comprises a substantially centrally located recess for receiving feed material from the substantially centrally located inlet.

In a preferred embodiment of the invention the at least one outlet is in flow communication with one or more elements selected from a cyclonic extractor, filter, a bag house, a gas collector and a condenser. Preferably the elements are configured in a manner allowing recovery of one or more of processed feed material, condensed water, condensed oils, gasses and heat. Preferably the apparatus is thermally insulated to minimise heat loss during operation.

In another preferred embodiment the apparatus comprises a heat exchanger to control processing temperature.

In another embodiment of the invention the at least one inlet is configured to allow control of gasses entering the chamber.

According to a preferred embodiment of the present invention there is provided a milling apparatus comprising:
  a chamber;
  at least one inlet in flow communication to an upper region of the chamber, wherein at least one said inlet is located substantially centrally within a roof of the chamber;
  a rotor located within the chamber that is rotatable about a substantially vertical axis by a rotation drive comprising a motor drivably engaged to a drive shaft that is in turn drivably engaged to the rotor, wherein the drive shaft enters the chamber from below;
  at least one feature located laterally on the rotor to promote a circulatory flow of feed material and/or gas within the chamber;
  at least one outlet in flow communication from a lower region of the chamber.

According to another preferred embodiment of the present invention there is provided a method of processing a feed material comprising:
  introducing the feed material into a chamber of a processing apparatus through at least one inlet that is in flow communication to an upper region of the chamber;
  imparting a circulatory flow upon the feed material within the chamber by rotation about a substantially vertical axis;

recovering processed feed material through at least one outlet that is in flow communication from a lower region of the chamber;

wherein the feed material is processed by undergoing at least one of milling, mixing, blending, separation, drying and sterilisation.

Preferably the rotor comprises at least one laterally located circulatory flow promoting feature.

Preferably the feed material comprises one or more of plant, animal or microorganism derived feed materials, waste materials, water requiring purification or solid material that is to be milled to produce a granulated or powdered product.

According to another embodiment of the present invention there is provided a method of producing a powdered, granulated and/or dried food, food ingredient or nutritional supplement comprising:

introducing a plant, animal or microorganism derived feed material into a chamber of a processing apparatus through at least one inlet that is in flow communication to an upper region of the chamber;

imparting a circulatory flow upon the feed material within the chamber by rotation about a substantially vertical axis of a rotor;

recovering a powdered, granulated or dried food, food ingredient or nutritional supplement through at least one outlet that is in flow communication from a lower region of the chamber.

Preferably the rotor comprises at least one laterally located circulatory flow promoting feature.

Preferably the plant derived feed material comprises sap, wood, plant leaves, seeds, roots, shoots, stems, branches, bark, fruit, nuts and/or components thereof. Preferably the animal derived feed material comprises meat, offal, eggs, milk, blood, skin, hair, fur, shell and/or components thereof. Preferably the microorganism derived feed material comprises bacteria or fungi, components thereof or products therefrom.

In another preferred embodiment the plant or animal derived feed material comprises one or more by-products from food or beverage processing or production, such as by-products are from fermentation, brewing, culturing, baking, cooking or food ingredient processing.

According to another embodiment of the invention there is provided a method of processing a waste material comprising:

introducing the waste material into a chamber of a processing apparatus through at least one inlet that is in flow communication to an upper region of the chamber;

imparting a circulatory flow upon the waste material within the chamber by rotation about a substantially vertical axis of a rotor;

recovering the processed waste material through at least one outlet that is in flow communication from a lower region of the chamber;

wherein the waste material is processed by undergoing at least one of milling, mixing, blending, separation, drying and sterilisation.

Preferably the rotor comprises at least one laterally located circulatory flow promoting feature.

Preferably, the waste material comprises treated or untreated sewerage, animal manure, paper, glass, offal, animal skin, shell, fur, hair or feathers, cementations material, rock, bitumen, hydrocarbon material, plastics, polymers, oils or fats or a by-product from mineral processing or extraction.

According to a further embodiment of the present invention there is provided a method for water purification comprising:

introducing water to be purified into a chamber of a processing apparatus through at least one inlet that is in flow communication to an upper region of the chamber;

imparting a circulatory flow upon the water to be purified within the chamber by rotation about a substantially vertical axis of a rotor;

separately recovering impurities and substantially purified water that have exited the chamber through at least one outlet that is in flow communication from a lower region of the chamber.

Preferably the rotor comprises at least one laterally located circulatory flow promoting feature.

Preferably the water to be purified is sea water.

According to another preferred embodiment of the invention there is provided a method of milling a solid feed material to produce a granulated or powdered material, comprising:

introducing the feed material into a chamber of a processing apparatus through at least one inlet that is in flow communication to an upper region of the chamber;

imparting a circulatory flow upon the feed material within the chamber by rotation about a substantially vertical axis of a rotor;

recovering a granulated or powdered material through at least one outlet that is in flow communication from a lower region of the chamber.

Preferably the rotor comprises at least one laterally located circulatory flow promoting feature.

Preferably the solid feed material is glass, wood, grain husks or chaff, concrete, rock, bitumen, plastics, polymer material or minerals.

BRIEF DESCRIPTION OF THE FIGURES

The present invention will be described further and by way of example only, with reference to the figures, wherein.

DETAILED DESCRIPTION OF THE INVENTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia.

In one broad aspect of the invention there is provided a feed material processing apparatus which comprises a chamber having at least one inlet that is in flow communication to an upper region of the chamber and a rotor located within the chamber that is rotatable about a substantially vertical axis, by a rotation drive. Preferably there is also provided on a lateral surface of the rotor at least one feature that promotes a circulatory flow of feed material and/or gas within the chamber, and at least one outlet that is in flow communication from a lower region of the chamber.

The present inventors have demonstrated that an apparatus of this type can be used to process a broad variety of feed materials such as by milling, mixing, blending, separation, drying and/or sterilisation. Throughout this specification and claims these processing outcomes will be referred to under the general description of "processing" or "processes".

Without wishing to be bound by theory it is believed by the present inventors that the processing capabilities demonstrated by the apparatus of the invention result from subjecting the feed material within the chamber to a circulating flow, with the result that discreet units of the feed material are subjected to repeated collisions with other discreet units and with interior surfaces of the chamber and rotor. Furthermore, however, discreet units of the feed material are believed not only to travel in a circulatory flow, but that these discrete units develop an orbital rotation, with the result that the discreet units of feed material have a high kinetic energy so that collisions of discreet feed material units involve sufficient energy to break chemical bonds of the feed materials, with the result that the feed material is ground or milled to a particulate form in a highly efficient and rapid manner. Furthermore, by virtue of the centrifugal force to which feed particles are subjected, larger particles are distributed towards the chamber wall in the course of their circulatory flow and are more rapidly driven toward a lower region of the chamber than smaller particles. These particle path characteristics allow the possibility of controlling or grading particle size (in terms of size and/or mass) of the processed material.

It is also believed that as a result of the circulatory flow of feed material collisions between discreet units or particles do not give rise to undue disruption to particle flow direction, enabling energy within the processing system to be maintained and processing to be extremely rapid. Although temperatures of feed materials may be elevated to high levels during processing, the feed materials are exposed to these high temperatures for only brief time periods. Without wishing to be bound by theory it is believed that this characteristic has the result that while the temperatures (if not otherwise controlled) may be sufficient to allow sterilisation by rupturing of living cells to inactivate bacteria or other microorganisms, the limited time of exposure to elevated temperature is generally not sufficient to degrade unstable chemical compounds within the feed materials.

In view of this explanation of the principles in operation during processing using the apparatus of the present invention it can readily be seen that the processing that may be conducted utilising the apparatus includes milling, mixing, blending, separation, drying and sterilisation of feed material. In this context "feed material" is used generally to refer to the wide variety of materials that may be subjected to processing utilising the invention. These feed materials may take a variety of physical forms including solids and liquids, slurries, suspensions and solutions. Some specific, non-exhaustive, examples of feed materials that may be processed according to the invention include plant or animal derived feed materials such as plant sap, leaves, wood, seeds, roots, shoots, stems, branches, bark, fruit, nuts and/or components thereof; animal meat, blood, offal (including animal internal organs and bone), skin, membrane, shell, fur, hair, feathers and/or components thereof; waste materials such as treated or untreated sewerage, animal manure, paper, glass, cementations material, rock, bitumen, hydrocarbon material, plastics, polymers, oils or fats and by-products from mineral processing and extraction; water requiring purification such as contaminated water resulting from industrial or cleaning processes, or salty ground or sea water or grey water from household use. The feed materials may also include solid materials such as glass, wood, grain husks or chaff, concrete, rock, bitumen, plastics or polymer material that is to be milled to produce a granulated or powdered product.

Some specific areas in which the apparatus and methods of the invention are applicable include: the production of powdered material from fruit or fruit pulp or from other plant material (e.g. wheat grass) that may be used as a food or nutritional supplement; the processing of poultry industry by-products such as milling and drying manure to form a powdered material that may be used in production of fertiliser, conversion of meat into meat flour, separation of membrane from egg to produce a cartilage powder and calcium carbonate powder and processing of animal carcasses (not only poultry) to produce powdered nutrient source that may be used in fertiliser; grinding, drying to powder and optional mixing of animal feed materials such as cut grasses or straw, corn stems, whey, algae, sea-weed etc.; grinding and extraction of ethanol, water, pigments and/or organic compounds (e.g. resveratrol and other plant secondary metabolites) from grape marque (waste product from wine production); grinding, sterilization and drying of by-products from beer fermentation to produce yeast extract; grinding, sterilization and drying of food ingredients (eg. peanuts, yeast, eggs) for use in food production or to use as dehydrated foodstuffs for subsequent rehydration; drying and grinding of pumice; grinding of mineral dross (e.g. from aluminium smelting) to produce powder or granular material that may be useful in production of ceramics; drying and grinding of wood chips or shavings to wood powder; grinding to powder of rice husks for silicon extraction; granulation of polystyrene pieces to small balls; drying and grinding of coal and the de-salination of sea water, for example.

By "milling" it is intended to mean that a grinding process takes place to reduce particle size of the feed material. Solid feed materials may be introduced into the apparatus in large chunks or fragments that through repeated collisions are fractured to much smaller particle size. For example, the material produced through this grinding or milling process may have average particle size (diameter) of between about 100 nm to about 10 mm, preferably between about 1 mu.m to about 1 mm and most preferably between about 5 mu.m to about 100 mu.m, although particle size may be varied in a controlled fashion either within or outside these ranges, as will be further discussed below.

In view of the relatively high temperatures that are generated during processing, the apparatus will cause vaporisation of volatile agents such as water, alcohols such as ethanol, volatile oils or other organic compounds, which can be collected following processing. As a result, the present apparatus can also be used for drying or dehydration of feed materials. Similarly, agents within the feed material may be separated from other agents within the material by virtue of differing physical properties such as phase transition temperatures, solubility, charge, relative particle size magnetic properties for example.

Furthermore, when two or more feed materials are processed the apparatus may be utilised to effect mixing or blending. Also, in view of the high temperatures during processing the apparatus can be used to effect sterilisation of feed materials. This is of particular relevance in the case of plant or animal derived matter where it may be desirable in order to produce a food or pharmaceutical grade product, to increase storage life, to minimise degradation or to substantially eliminate odours associated with a material, to eliminate or substantially reduce microbial activity within the material.

In the course of processing it may be desirable depending upon the intended product to operate the process with air being introduced into the apparatus, to control the nature of gas introduced (such as conducting processing in a nitrogen, oxygen or other gas atmosphere) or to operate the processing under a vacuum or partial vacuum condition. For example, in the case of readily oxidisable feed materials it may be desirable to conduct the processing in a nitrogen atmosphere. This can readily be achieved utilising the invention, as will be discussed further below.

Figure 1:
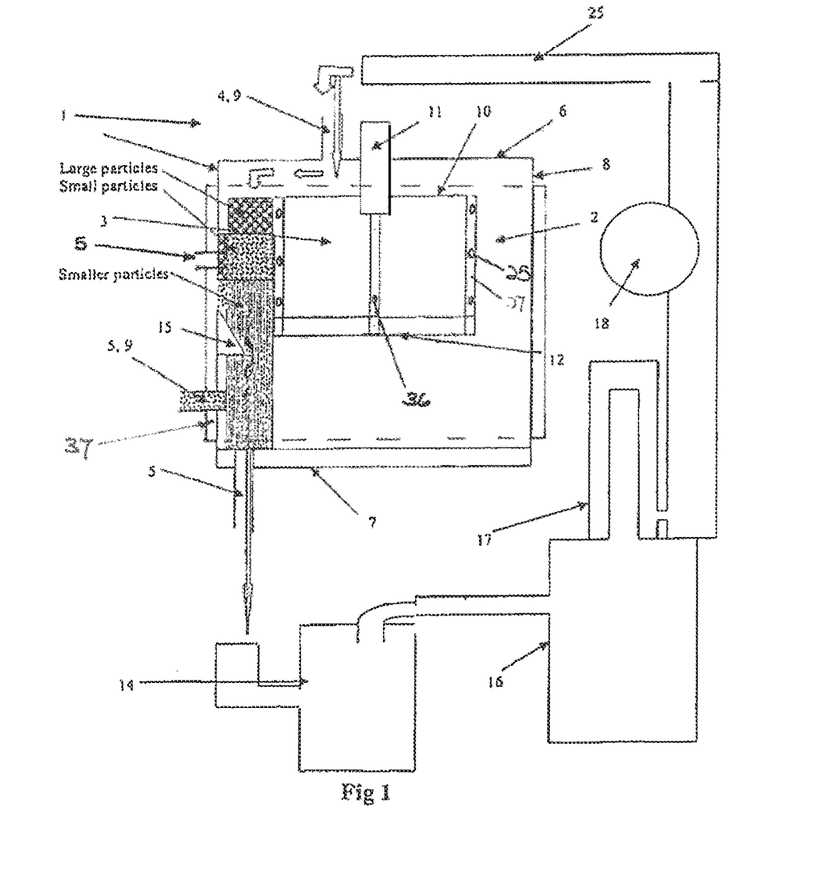
FIG. 1 shows a schematic representation of the processing apparatus.
Figure 6:
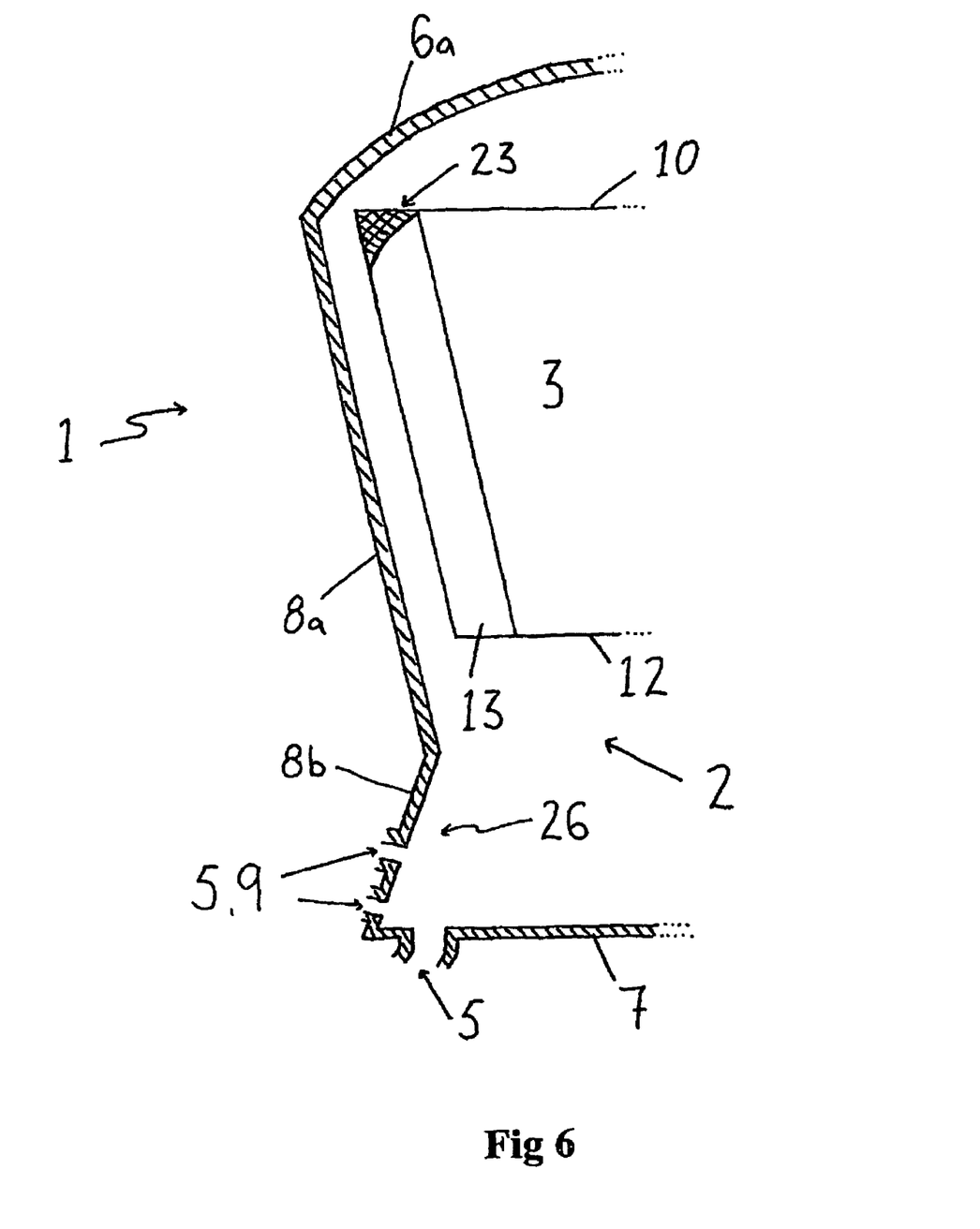
FIG. 6 shows a partial diagrammatic cut away side view of a chamber of the invention with domed roof, narrowing side walls of chamber and rotor and chamber side walls that widen in diameter at the base.

As shown in FIG. 1 the processing apparatus 1 of the invention comprises a chamber 2 containing a rotor 3, at least one inlet 4 and at least one outlet 5. The chamber itself may take a variety of configurations, but in view of the need to house the rotatable rotor it is desirable that the chamber has a circular horizontal cross sectional shape. While in one embodiment the chamber may be cylindrical in shape with roof 6, base 7 and side 8 walls it is also possible, for example, for the chamber to taper either to a point or to a base 7 or mid-point that is narrower in diameter than the roof 6. A tapering side wall 8a is for example depicted in FIG. 6. In still further embodiments there may be, or may also be, a region 26 at the base of the chamber where the diameter of the chamber widens. A widening region 26, formed by a widening side wall 8b, is also shown in FIG. 6. This widening region 26 can be useful in discriminating between processed or partially processed particles of differing diameter and/or mass, by having outlets 4 at differing heights of this widening region 26.

The chamber 2, the rotor 3 and other major chamber components will preferably be formed of a hard and high temperature tolerant material such as steel or preferably hardened steel or other metal alloys or ceramic material. In view of elevated operating temperatures it is desirable that components of the apparatus that must interact during operation are compatible in that they exhibit similar thermal expansion properties and that they can readily be joined, fused or fixed as necessary. In one preferred embodiment there is provided heating or cooling features in conjunction with the roof 6, base 7 and/or side 8 walls. For example such heating or cooling features (eg. heat exchanger) may comprise channels or chambers located within or external to the walls, adapted to contain a heating or cooling fluid, which is preferably in fluid communication with a fluid reservoir, the temperature of which is maintained or altered by conventional heating or cooling techniques. The heating or cooling fluid may for example comprise air, gas (e.g. hydrofluorocarbon gas), oil or water. In a similar manner the heat exchanger can comprise a jacket (such as a water jacket 37) containing a cooling fluid that may be placed over or around the apparatus to effect transfer of heat away from the apparatus during operation and thus maintain the operating temperature at a controlled level.

The roof 6, base 7 and side walls 8 of the chamber 2 may be formed or moulded by a variety of known techniques and may comprise a single unit or may be formed from a number of component parts that are either fused or preferably removably fastenable to form the chamber 2. In one preferred embodiment the side wall 8 comprises a unitary component that is then fixed or releasably fastened to a separate roof 6 and base 7. For example fixing of the components that together form the chamber 2 may be by welding, and releasable fastening of components may be effected using bolts, clamps, clips or other suitable releasable fastening mechanisms. A gasket or gaskets that will tolerate operational temperatures may be utilised to ensure optimal sealing between components.

The at least one inlet 4 to the chamber 2 comprises an opening into an upper region of the chamber 2. By "upper region" it is intended to mean that the at least one inlet 4 is located above the at least one outlet 5. Preferably the at least one inlet 4 is located to allow introduction of feed material into the chamber 2 into an upper third of the chamber 2, and preferably such that the feed material can be introduced above the rotor 3. Similarly, the at least one outlet 5 is located to allow removal of material from a lower region of the chamber 2. In this context the term "lower region" is intended to convey that it is located below the at least one inlet 4, and preferably within a lower third of the chamber 2.

There may be a plurality of inlets 4 provided. For example, there may be provided dedicated inlets 4 for differing feed materials such as for solid and liquid feed materials or for gas that is to be drawn into the chamber 2 during processing, such that by operating closures or variable apertures associated with these inlets 4 the amount or relative amounts of feed materials and gas introduced into the chamber 2 may be controlled.

A plurality of outlets 5 may also be provided and they may for example be positioned at varying heights of the side wall 8 of the chamber 2 or at positions of varying radial displacement in the base 7 of the chamber 2. Adoption of several outlets 5 in varying positions will enable removal of processed or partially processed feed material at a variety of processing stages or particle sizes and/or masses. In an important preferred embodiment of the invention at least one of the outlets 5 forms, in conjunction with at least one of the inlets 4, a recirculation circuit 9, allowing processed or partially processed feed material to be removed from a lower region of the chamber 2 and returned to an upper region of the chamber 2, for further processing. For example tubing or pipes that may be releasably fixed about the inlets 4 and/or outlets 5 may allow for flow communication of feed materials or processed or partially processed material from the outlets 5 to the inlets 4 of the recirculation circuit 9.

In order to direct processed or partially processed feed material towards the at least one outlet 5 and/or to assist or promote in the grading of processed or partially processed feed material by particle size and/or mass, there is provided in one embodiment of the invention a ledge, shelf or screen 15 adjacent to or in association with one or more of the outlets 5. The ledge, shelf or screen 15 may be located and configured in such a manner to deflect circulating feed particles towards a particular outlet 5 or may operate by establishing a low pressure zone within the chamber 2 in the vicinity in the outlet 5 to thereby draw processed or partially processed feed material towards and into the outlet 5. The intention of the ledge, shelf or screen 15 is that coarse material will remain in the grinding zone above the ledge, shelf or screen 15 for further processing as only lighter material will pass below this point due to the increased centrifugal force to which heavier particles are subject. Width of the ledge, shelf or screen 15 can be varied to alter the size/mass of particles passing into the lower region of the chamber.

In another aspect of the invention a ledge or shelf (not shown) is provided within the chamber 2 in association or adjacent to at least one of the inlets 4, onto which feed material introduced into the chamber 2 is initially directed. The benefit of providing a ledge or shelf in association with the inlets 4 is to allow acceleration of feed material within the chamber 2 before the feed material contacts the upper surface 10 of the rotor 3. This has the effect of minimising both energy loss associated with introduction of feed material into the chamber 2 and minimising wear and tear on the upper surface 10 of the rotor 3.

Within the chamber 2 a rotor 3 is provided that is rotatable about a substantially vertical axis by a rotation drive 11. The rotor 3 can take a variety of configurations, although it is a preferred aspect of the invention that at least one feature is located laterally on the rotor to promote a circulatory flow of feed material and/or gas within the chamber 2. For example, in one embodiment the rotor 3 has a square horizontal cross sectional shape such that the features promoting circulatory flow are the corners of this square shape, which when rotating impart a force upon contents of the chamber 2. More commonly, however, the rotor 3 is configured with a substantially circular horizontal cross sectional shape in the form of a cylinder, conical section (see FIG. 6) or cone, but with features provided laterally on the rotor 3 to promote circulatory flow. For example, however, the rotor 3 can also have a horizontal cross section with two or more radiating limbs (not shown), such as opposing limbs at 180 degree., three limbs spaced at 120 degree., four limbs spaced at 90 degree., five limbs spaced at 72 degree., six limbs spaced at 60 degree., eight limbs spaced at 45 degree., ten limbs spaced at 36 degree. or twelve limbs spaced at 30 degree., for example. Preferably such limbs are evenly spaced, as exemplified above, to ensure balance and stability during rotation. The limbs mentioned in this aspect of the invention may comprise substantially vertically located planar pieces of material fused or connected at or adjacent to a central axis of the rotor. Preferably rotation of the rotor 3 is about a substantially vertical axis such that the force of gravity may be utilised in conjunction with the centrifugal force developed through rotation of the rotor 3, to discriminate between processed or partially processed material on the basis of particle mass. Assuming the particles are of the same density then particle mass will be directly proportional to particle size.

In other aspects of the invention the feature located laterally on the rotor 3 to promote a circulatory flow within the chamber 2 takes the form of at least one projection 27 and/or depression 36. For example, where the feature comprises at least one depression, this may take the form of one or more grooves or troughs within a lateral surface of the rotor 3, that may for example be substantially vertical or coaxial with the axis of rotation of the rotor 3 or may, for example, have a helical or spiralling configuration. In other embodiments of the invention the feature can comprise at least one spike and/or nodule 25 and preferably a plurality of spikes and/or nodules form at least one row of spikes and/or nodules, that may similarly be substantially vertically located on a lateral surface of the rotor 3, or may have a helical or spiralling configuration. In another embodiment of the invention the feature may comprise at least one bar 13 or blade (not shown) that projects laterally from the rotor 3 and is preferably vertical or coaxial with the axis of rotation of the rotor 3, but may also, for example, take a curved shape that is spiralling or helical in configuration. In the case of the feature comprising at least one row of spikes and/or nodules or a bar 13 or blade, the rotor may be provided with one to many rows, bars 13 or blades, such as 1 to 50, preferably 2 to 20, more preferably 4 to 10 and most preferably 5 to 8 rows, bars 13 or blades, depending upon the scale of the apparatus 1 and the size of the rotor 3.

In another embodiment of the invention the upper surface 10 and/or lower surface 12 of the rotor 3 is/are provided with at least one projection such as at least one spike and/or nodule, row of spikes and/or nodules 25 or bar or blade, which in the case of rows of spikes and/or nodules 25 and bars and blades are configured to radiate from the substantially central axis of rotation of the rotor 3. Such projections on upper 10 and/or lower 12 surfaces of the rotor 3 will serve to assist establishment of a circulatory flow within the chamber and may, in the case of projections on the upper surface of the rotor 3, assist in directing feed material introduced into the chamber 2 to the periphery of the chamber 2 during processing.

It should also be understood that relative dimensions of the rotor 3 such as height or depth of lateral features; presence, absence and dimensions of upper or lower projections, vertical height of the rotor 3 itself; and spacing between the lateral edge of the rotor 3 and the side wall 8 of the chamber, may be varied depending upon the desired outcome of feed material processing. Such variability will influence particle size processing time, operational temperature, drying, mixing, blending, sterilising and separating efficiency and energy consumption, for example. These and other aspects of apparatus 1 configuration can readily be optimised by skilled persons based upon the intended processing outcome or outcomes.

A rotation drive 11 is provided to rotate the rotor 3 about a substantially vertical axis. The rotation drive 11 comprises a motor 19 that is drivably engaged to a drive shaft 20 that is in turn drivably engaged to the rotor 3 through its substantially vertical axis. For example, the motor 19 may comprise a variable speed electric motor, although other types of motors are equally envisaged. The drive shaft 20 may constitute an axle that is fixed or releasably locked substantially vertically through the centre of the rotor 3, with the axle being driven by the motor via a belt 27, chain or the like, for example. The drive shaft 20 may penetrate through the roof 6 and/or base 7 of the chamber depending upon whether the motor or motors 19 are located above and/or below the chamber 2. Preferably the motor 19 is located below the chamber 2 and the drive shaft enters the chamber 2 from below, thus allowing an inlet 4 to be located substantially centrally within the roof 6 of the chamber 2. In this way the air curtain effect upon feed material introduced into the chamber 2 is minimised. In the situation where the inlet 4 is located substantially centrally within the roof 6 of the chamber 2 there may be a depression 21 (see FIG. 4) located substantially centrally within the upper surface 10 of the rotor 3, into which feed material will initially be deposited upon being introduced through the inlet 4.

Figure 2:
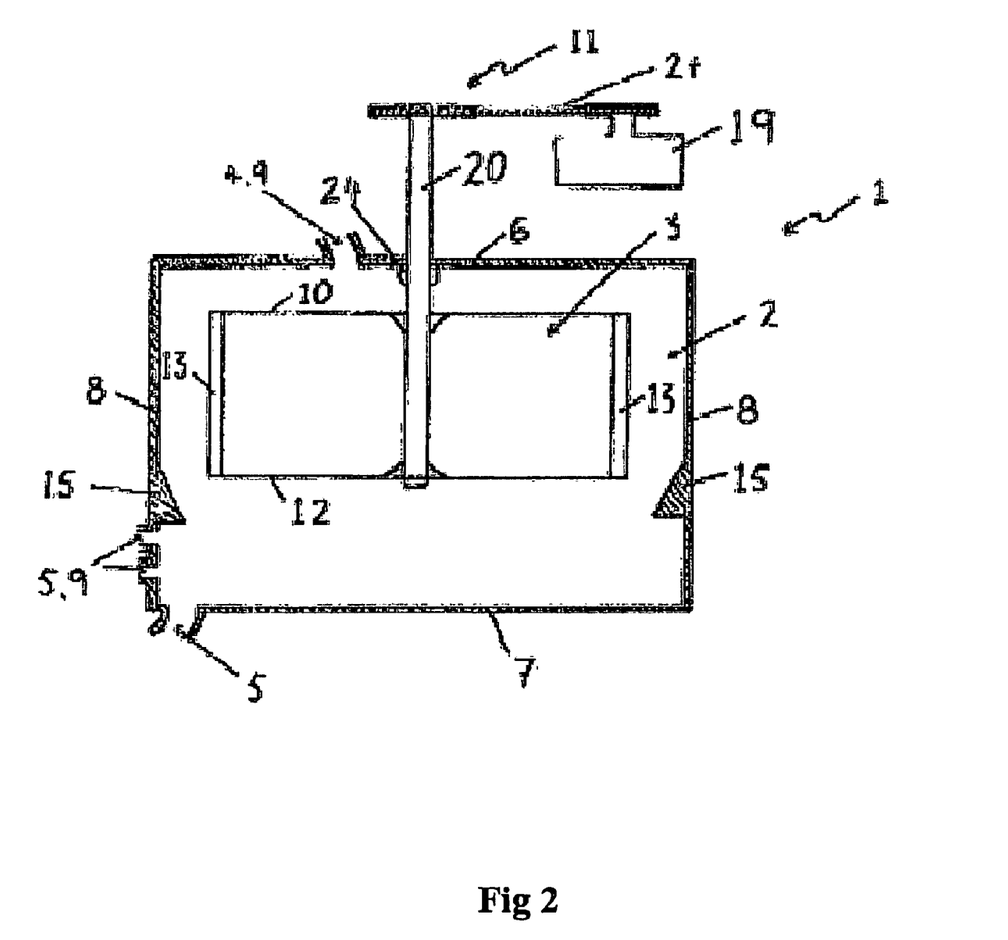
FIG. 2 shows a diagrammatic cut away side view of a chamber of the invention with flat roof and top located rotation drive.
Figure 3:
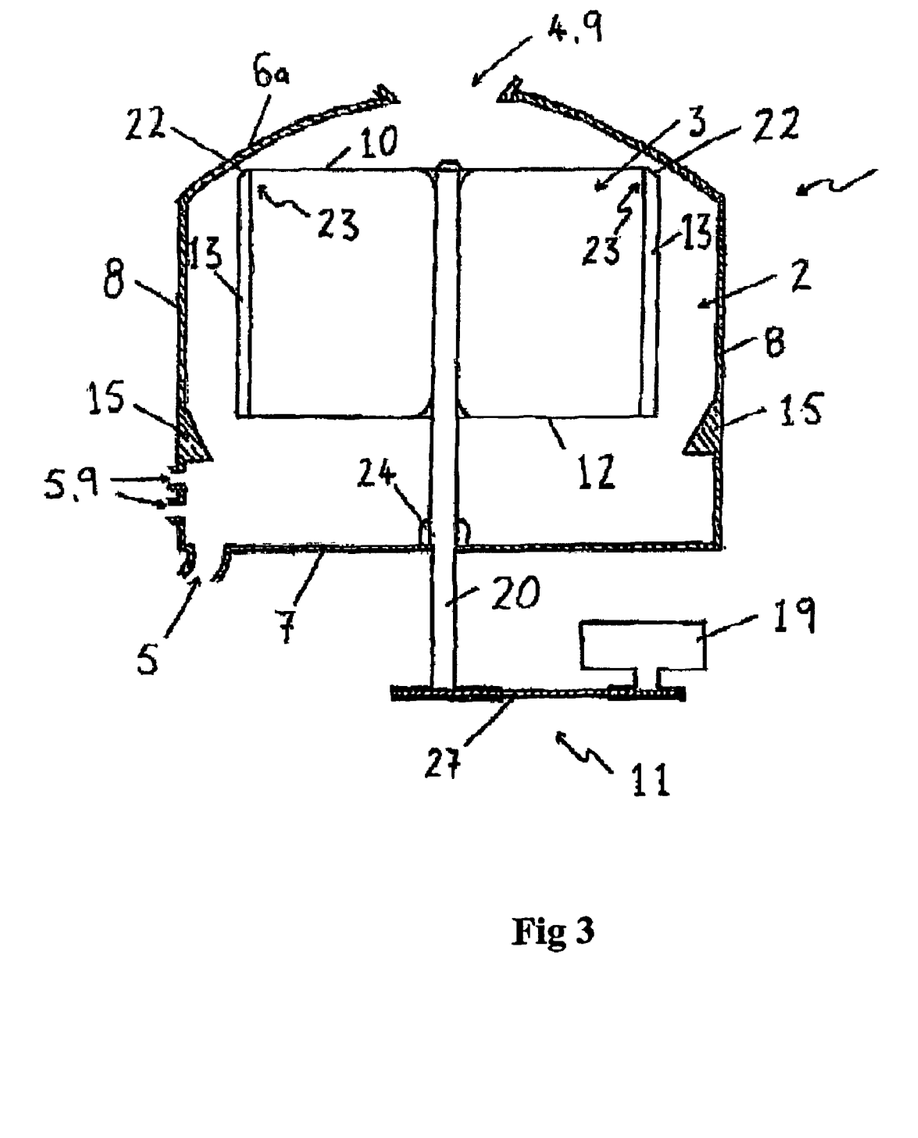
FIG. 3 shows a diagrammatic cut away side view of a chamber of the invention with domed roof, bottom located rotation drive and bevelled rotor/feature upper edges.
Figure 4:
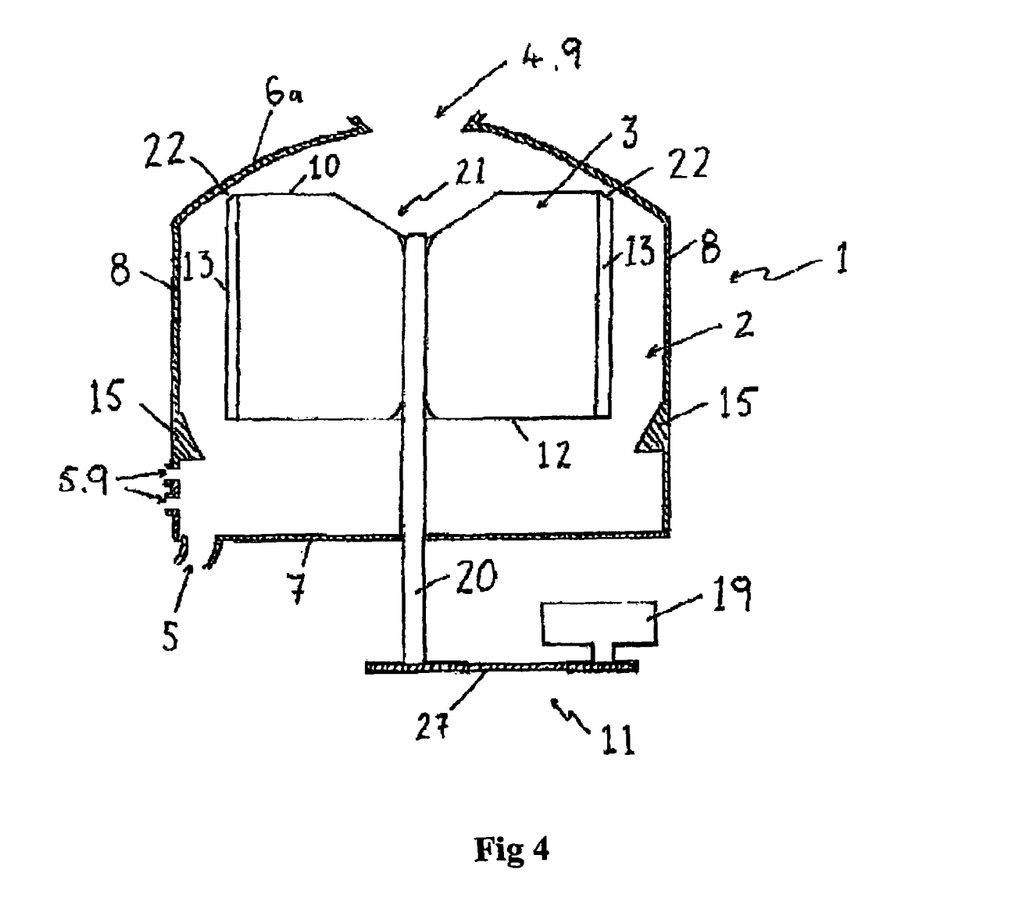
FIG. 4 shows a diagrammatic cut away side view of a chamber of the invention with domed roof, bottom located rotation drive and recessed centrally located upper rotor surface.
Figure 5:
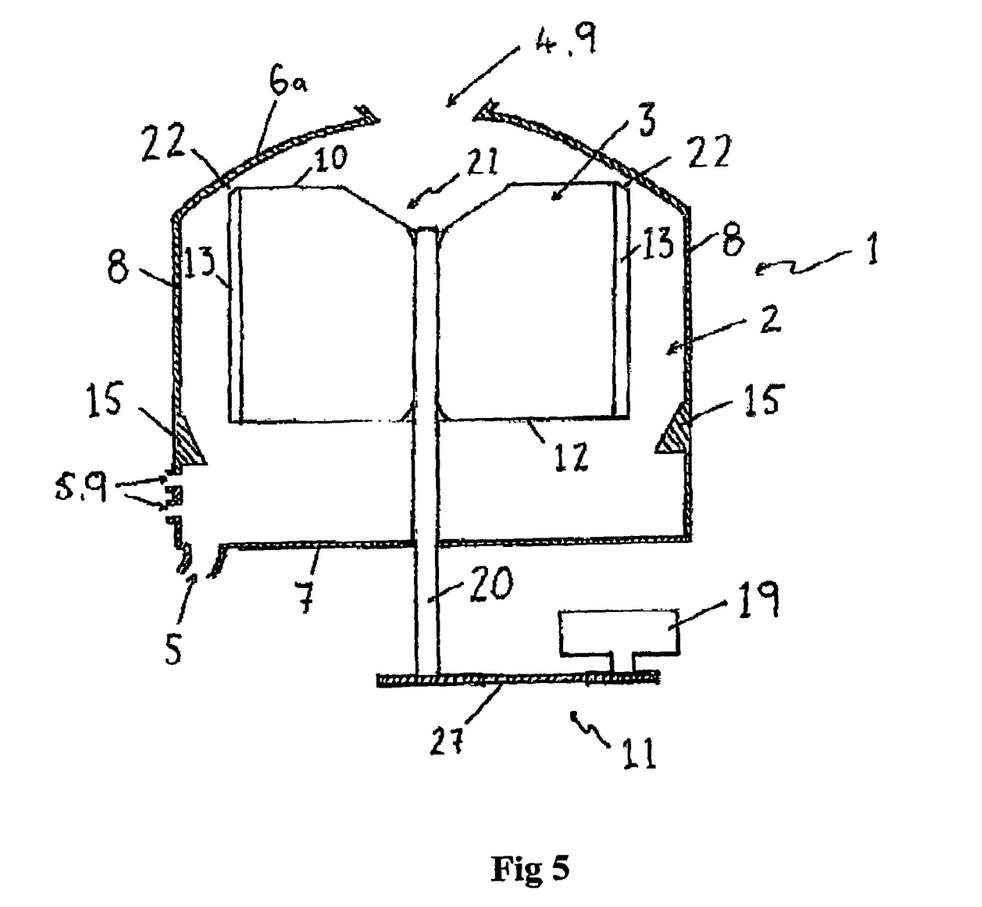
FIG. 5 shows a diagrammatic cut away side view of a chamber of the invention with domed roof, bottom located rotation drive and domed upper rotor surface.

The roof 6 of the chamber 2 may, for example be flat as shown in FIG. 2 or domed 6*a* as shown in FIGS. 3 to 6. In the case of a domed roof 6*a* it may be desirable to provide upper edges of the rotor 3 and/or of the feature/s located laterally on the rotor that are bevelled, preferably so that the bevelled edges 22 (as shown in FIGS. 3 and 4) have a profile that corresponds to the profile of the domed roof 6*a*. The upper surface 10 of the rotor 3 may also be domed 10*a*, as shown in FIG. 5, or angled, preferably also having a profile that corresponds to that of the roof 6,6*a*. It may also be appropriate for particular regions of the rotor 3 or side wall 8 to be formed from, or coated with, a hardened material such as hardened steel, carbon tungsten, zirconia, diamond or the like. An example of this is depicted in FIG. 6 where an upper corner 23 of a bar 13 located laterally on the rotor 3 is shown as being coated with a hardened material. It is of course possible, depending on the nature of the processing being conducted, the type of feed material and the set up of the apparatus 1 for other regions to be coated with, or formed from, hardened material. For example the features that promote circulatory flow and/or heavy wear regions of the rotor 3 and/or the chamber 2 side walls 8 can be coated or formed from hardened material.

Also depending on the nature of the processing being conducted, the type of feed material and the set up of the apparatus 1 it may be appropriate to form or coat particular regions of the rotor 3 and/or chamber 2 side walls 8, roof 6 and/or base 7 with a non-stick material, such as a non-stick polymer (for example, polyethylene or polypropylene), a non-stick titanium compound such as a titanium carbide or titanium dioxide, Teflon™ or other conventional non-stick materials to minimise sticking of feed material to components of the apparatus 1.

A clutch may also be conveniently provided to allow disengagement of the motor from the drive shaft, particularly to avoid damage to the apparatus 1 in the case where rotation of the rotor 3 is restricted, or jamming occurs. In conjunction with the rotor 3 a positive pressure scroll 24 (see FIG. 2) or similar device may also be provided to substantially prevent feed material or processed or partially processed feed material entering the housing of the drive shaft or associated bearings.

For further processing of materials following their exit from the chamber via the at least one outlet 5, at least one of the outlets 5 may be configured in flow communication with further elements such as a cyclonic extractor 14, filter (not shown), a bag house 16, a gas collector 17 and a condenser 18, which may for example be connected in sequence or in series, depending upon the desired processing product. Preferably all elements of the apparatus 1 including the chamber 2 are thermally insulated to minimise heat loss during processing and preferably the elements are configured in a manner to allow recovery of processed material, liquid, gas and heat. In a preferred embodiment of the invention the gas utilised during processing can be controlled in both type and amount so that processing may be conducted under conditions of a vacuum or partial vacuum, in air or in specified gaseous atmospheres, such as for example under nitrogen in the situation where the presence of oxygen may give rise to degradation of materials being processed. Preferably also, gasses recovered from the outlet 5 and through any additional processing elements employed can be captured and recirculated through the inlets 4, such that the system is operated in a closed environment without, or at least with minimal, release of gas to the environment.

Another feature of the operation of the apparatus 1 that may readily be optimised depending upon the nature of the feed material to be processed is the speed of rotation of the rotor 3. As a general rule increased rotor 3 rotation speeds will give rise to shorter processing times, greater heat generation and therefore drying efficiency. Increased rotor 3 rotation speeds will also result in reduced average particle size of product material. For example, the rotor 3 may operate at speeds between about 200 km/hr and about 1,200 km/hr, preferably at speeds between about 300 km/hr and about 1,000 km/hr and most preferably at speeds between about 500 km/hr and about 850 km/hr.

In operation of the apparatus 1 the feed material is introduced into the chamber 2 through an inlet 4. Feed material introduced onto an upper surface 10 of the rotor 3 is accelerated by rotation of the rotor and transferred to a lateral region of the chamber 2 by centrifugal force. The feed material is then set in its circulatory flow, with discreet units of the feed material having an orbital rotation applied thereto. As earlier discussed, processing feed material takes place by virtue of collisions of discrete units of the feed material with other discrete units and with the side wall 8 of the chamber 2 and the bars 13 that project laterally from the rotor 3, if present. Higher mass and/or larger diameter particles within the circulatory flow established in the chamber 2 tend to be located higher in the chamber 2 and towards the side wall 8 whereas smaller, lower mass particles are located lower in the chamber 2 and further inwardly from the side wall 8, due to the presence of the screen 15 that narrows the chamber 2 diameter in a lower region thereof. An outlet 5 located in a lower region of the chamber 2 is in flow communication with an inlet 4 to form a recirculation circuit 9 allowing removal from a lower region of the chamber 2 of larger particulate matter or incompletely processed feed material, which is reintroduced to an upper region of the chamber 2 for further processing. Completely processed feed material is able to exit the chamber 2 through other outlets 5 and may then be further processed in other elements of the apparatus 1 such as a cyclonic extractor 14, a bag house 16, a gas collector 17 and condenser 18, each of which is in flow communication. Warm dry air that has passed through these elements may then be returned to an inlet 4 via a communication 25 for re-use.

Processing of feed materials of specific types such as plant or animal derived feed material, waste materials, water requiring purification or solid feed materials may be achieved under operating conditions optimised in respect of the desired product.

The invention will now be described further with reference to the following non-limiting examples:

EXAMPLES

Example 1

Processing of Grape Marque

Grape marque constitutes the remnants left after the juice has been squeezed for the wine making process. The grape marque contains seeds, skin and remnants of flesh as well as some small percentage of juice that has not been squeezed. The grape marque has in the past presented many problems in that it is a waste product and generally there is a cost in finding a suitable means for disposal of this material.

There are many valuable products within grape marque, which are generally costly to separate. For example, the seeds contain oil but to extract the oil the seeds need to be subjected to a complicated separation process. There are also compounds within the marque including secondary metabolites such as resveratrol that may have medicinal properties, such as for treating cancer or protecting against heart disease. There are food-colouring and flavouring agents within the marque, all of which require expensive extraction processes.

By utilising the apparatus of the invention it is possible to improve the processing of grape marque. The marque can then be processed by conventional means, except that the extracts are more easily removed because of the improved pulverisation associated with this technology. Conventional processes require the grape marque to be processed within seven days because of the rapid decomposition of the material due to a high water content. Using this technology removes the water to below 4% where the bacterial activity is reduced and the material can be stored such that extraction of useful materials can be conducted over a much longer period of time. This technology helps to capture many of the valuable components within the marque and turn them into a profitable series of products or product ingredients, such as active compounds and extracts, vinegar, health wine, cooking wine, cosmetics, nutrient supplements and grape seed oil.

Running the marque through the apparatus of the invention results in separation of the alcohol and water whilst at the same time pulverizing the entire solids in the marque, including the seeds. By crushing the seeds the oils are released and can be collected or left in with the grape marque residue (it is important to note that the grape seed oil oxidises quickly once the seed is opened and this can give rise to spoiling of the marque residue if the process is delayed).

Health wines or vinegars can be produced by mixing the extracts from the marque (or must) after processing according to the invention.

This processing of wine marque offers an important breakthrough as it overcomes a significant environmental waste problem associated with the wine industry, at the same time as producing a profit centre.

In carrying out this process it is preferred to grind the wet grape marque to a fine powder without undue heating of the material (ie. maintaining temperature of the chamber contents between about 30 and 80 degrees C., preferably between about 35 and 50 degrees C., at the same time separating out the alcohol and water in such a way that substantially all of the liquid is retained and collected. This is achieved by running the marque through the apparatus of the invention wherein the rotor is spun preferably at above two hundred miles per hour, and more preferably at 500 miles per hour or more.

This processing causes the material to break down into fine particles, which along with vaporised moisture exit the machine and are separated in a separator consisting of two or more pressure sealed containers the first of which is a vortex separator with material entering the side port at a tangential angle, and with the material exiting through a similar diameter exit hole in the centre of the lid to the container which has part of the exit tube descending into the space in the drum. A relatively dry solid product is distributed in the first drum and the steam including the alcohol is transported to the second drum. The second drum has a filter bag mounted into the lid and the steam ascends through this bag ensuring that very little solid matter escapes with the steam. The steam is then caught in a tube and is condensed and collected. The dry air may be returned through the inlet along with new grape marque, which assists to conserve heat and minimise loss of material to the atmosphere. Alternatively it is possible to remove moisture and fine particles from the air with the use of a scrubber and or a reverse cycle air conditioner before returning the dry air to the machine.

The remnant must has value as a skin treatment because it is so fine and has such great surface area that it provides a vehicle for facilitating absorption of agents across the skin. This material can therefore be incorporated in skin treatment creams. It is ideal for this material to be below 100 micron and preferably below 30 micron in diameter. It is preferred to reduce water content of the must below 5% moisture and preferably below 3% moisture.

Example 2

Processing of Poultry Manure

Poultry manure has been widely recognised as providing a useful nutrient source to promote plant growth. Normally the manure contains about 60% moisture when it is collected from the chicken house. It is preferred to reduce that moisture content as soon as possible to minimise bacterial activity in the manure. Once the moisture is removed the product is preserved to a major extent. Wet manure produces a very strong odour and is unpleasant if stored in a public area.

When the manure is processed using the apparatus of the invention, the material is both ground and dried simultaneously to result in a product that can be stored for long period in sealed bags. When this material is subsequently exposed to water a liquid manure product useful as a fertiliser is produced, the sediment of which can be separated. The fertiliser is suitable to be diluted and dispensed through most irrigation and spraying systems.

Samples of manure processed with the apparatus of the invention when operating at 50 hz produced a material with particle diameter below 100 micron, with an average particle diameter of around 50 micron and a moisture content below 1.5% moisture.

Example 3

Processing of Pumice

Pumice is an aerated volcanic glass that is pozzolanic and can be used as a cement additive to produce high strength concrete if the material is ground to particles of average diameter preferably below 10 micron.

Grinding in the apparatus according to the invention cost effectively dries and grinds the pumice in a single step. A sample of pumice pieces was ground at 50 hz to produce a product having particle diameter of under 7 micron, with an average particle diameter of 2 micron and a moisture level below 1%, which was suitable for use as a cement additive.

Example 4

Production of Wholemeal Bread Flour from Whole Wheat

Several experiments were conducted on the production of wholemeal bread flour from whole wheat. The first experiment utilised an arrangement of the inventive apparatus where the gap at the side of the chamber between the lateral surface of the rotor and the chamber side wall was 12 mm. In this case the apparatus was operated 40 Hz and a water jacket heat exchanger was utilised to maintain the contents of the chamber at approximately 40 degree. C. during processing. A very fine and evenly dispersed flour was produced having particle sizes in the range of approximately 50-80 mu.m. Unlike conventional wholemeal flour larger and darker coloured particles of flour were not present.

In a second experiment an arrangement of the apparatus was utilised where the gap between the lateral surface of the rotor and the side wall of the chamber was 4.5 mm. The apparatus was operated at 32-35 Hz, again utilising a water jacket to maintain the temperature of the processed feed material at approximately 40 degree. C. A wholemeal flour comprising fine and evenly dispersed particle sizes was produced, with particles having diameters in the range of 50-80 mu.m.

Example 5

Production of Cake Flour from Coarse White Bread Flour

Using a feed material of coarse white bread flour with particle sizes in the range of 60-100 mu.m fine cake flour was produced by processing with the apparatus according to the invention. The apparatus was operated at 50 Hz, using an embodiment where the gap between the lateral edge of the rotor and the side wall of the chamber was 12 mm. Temperature was not controlled and was thus in the range of 90-115 degree. C. The resulting cake flour was very fine with evenly dispersed particle diameters less than 12 mu.m, and averaging 5 mu.m.

In view of the relatively high processing temperature glutens within the flour were destroyed and starch content was modified, thus making the product especially suitable for baking of cakes.

Example 6

Processing of Fresh Rosemary to Produce Dried Herb

Rosemary leaves and small twigs were stripped away from branches and processed utilising the apparatus according to the invention. The apparatus was operated at 50 Hz using a water jacket to maintain processing temperature at approximately 40 degree. C. The product produced was a fine bright green coloured powder, having moisture content of approximately 2.5%. The powder retained its aromatic odour and was useful for flavouring floods.

Example 7

Production of Peanut Butter

A commercially available peanut butter blend comprising cooked peanuts, salt, sugar and rice flour was processed using the apparatus according to the invention. The apparatus was operated at 50 Hz, while maintaining processing temperature at approximately 80 degree. C. by slowing the rotor speed when the processing temperature rose above this threshold. The product produced was a liquid state peanut butter of the consistency of warm treacle, which when left to cool to room temperature took on the character of a finely ground peanut butter product.

In a second experiment quantities of salt, sugar, rice flour and cooked peanuts were separately processed using the apparatus of the invention, under the same conditions as mentioned above. The separate products, each having average particle sizes of approximately 5.mu.m were then recombined in the apparatus under the same conditions. By initially processing the ingredients separately it was possible to eliminate the buffering effect of oils upon the grinding process to thus achieve smaller particle sizes than when processing was conducted in combination. The product produced was an extremely finely ground peanut butter.

Example 8

Production of Insulating Material from Waste Paper and/or Wool

Shredded newspaper was processed using the apparatus of the invention operating at 30 Hz, but maintaining temperature at approximately 80 degree. C. by slowing the rotation speed of the rotor if the temperature exceeded this threshold. Processing in this manner produced extremely fine paper fibres in the form of a fluff, which may be used as an insulation material.

In a similar manner leg crutchings from merino sheep that had previously been washed in a conventional manner to remove dirt and most oils were fed into the apparatus according to the invention as tufts. The resulting product was an extremely fine fibre fluff, which had tangles and knots present within the original feed material removed. Wool tufts and shredded newspaper were also processed together under the same conditions, to produce fine fibre fluff useful as insulating material. The resulting combination fluff product was harder to compress than individual wool or paper fluff produced using the apparatus.

Feathers obtained from an abattoir were also processed under the same conditions to produce very fine dry fibres.

Example 9

Processing of Brewery Yeast Waste

Experiments were conducted utilising as feed material a yeast waste obtained from a commercial brewery. When processed at temperatures of 40-80 degree. C. and rotor speeds of 25-35 Hz, water was removed from the yeast waste without damaging the yeast cells. The product is equivalent to a freeze dried yeast product, which upon rehydration can be reused as the yeast cells remain viable.

In a second experiment processing of the yeast waste was conducted at approximately 50 Hz and without temperature control (ie. temperatures of 90-120 degree. C.), with the result that yeast cells were ruptured, to thus become inactive. This approach provides a useful means of deactivating yeast waste for disposal.

It is to be understood that the present invention has been described by way of example only and that modifications and/or alterations thereto that would be obvious to a person skilled in the art based upon the disclosure herein are also considered to fall within the scope and spirit of the invention.

What is claimed is:

1. A feed material processing apparatus comprising:
   a chamber;
   at least one inlet in flow communication to an upper region of the chamber for receiving feed material;
   at least one outlet in flow communication to a lower region of the chamber for collecting processed feed material;
   a rotor located within the chamber so that there is an annular gap between an inner chamber wall and an outer surface of the rotor, the annular gap being less than the diameter of the rotor to promote classification of the feed material;
   at least one projection and depression located laterally on the rotor to promote circulatory flow of feed material within the chamber to subject particles of the feed stream to interparticulate collisions to reduce the feed stream particle size such that the feed stream particle size reduces as the feed stream travels from the upper region to the lower region of the chamber; and
   one or more screens or ledges that narrow the diameter of the chamber towards the base to deflect circulating feed material above the one or more screens or ledges to increase feed material residence time in the chamber.

2. The apparatus according to claim 1, wherein an upper edge of the rotor is beveled.

3. The apparatus according to claim 1, wherein an upper edge of at least one projection is beveled.

4. The apparatus according to claim 1, wherein an upper edge of said rotor is formed from or coated with one or more of hardened steel, carbon tungsten, zirconia or diamond.

5. The apparatus according to claim 1, wherein one or more surfaces of the chamber, the rotor and projection is/are coated with a non-stick material.

6. The apparatus according to claim 1 including outlets at varying vertical positions of the chamber to allow removal from the chamber of feed material particles of graded size or mass.

7. The apparatus according to claim 1 including at least one recirculation circuit between an outlet and an inlet to allow return of feed material from a lower region to an upper region of the chamber.

8. The apparatus according to claim 1 comprising a ledge, shelf or screen within the chamber adjacent to the at least one outlet to direct feed material particles to the outlet and/or to promote grading of feed material particle size or mass.

9. The apparatus according to claim 1, wherein the at least one projection includes at least one row of spikes and nodules.

10. The apparatus according to claim 1 comprising a motor driveably engaged to a drive shaft that is in turn driveably engaged to the rotor through a central axis thereof.

11. The apparatus according to claim 10 comprising a positive pressure scroll within the chamber to reduce ingress of feed material to drive shaft associated bearings.

12. The apparatus according to claim 10, wherein the motor is a variable speed electric motor.

13. The apparatus according to claim 10, wherein the drive shaft enters the chamber from above.

14. The apparatus according to claim 10, wherein the drive shaft enters the chamber from below.

15. The apparatus according to claim 14, wherein an inlet is located substantially centrally within a roof of the chamber.

16. The apparatus according to claim 1, wherein at least one outlet is in flow communication with one or more of a cyclonic extractor, a baghouse, a gas collector and a condenser.

17. The apparatus according to claim 1, including thermal insulation to minimize heat loss during operation or a heat exchanger to control processing temperature.

18. A method of processing a feed material comprising:
introducing the feed material into a chamber through at least one inlet that is in flow communication with an upper region of the chamber and recovering processed feed material through at least one outlet that is in flow communication from a lower region of the chamber;
imparting circulatory flow on the feed material and resultant processing of the feed material within the chamber as the feed material flows downwardly from the intlet to the outlet by rotating a rotor having at least one projection and depression located laterally on the rotor that promotes circulatory flow and processing of the feed material;
with the feed material being processes by undergoing at least one of milling, mixing, blending, separation, drying and sterilization; and
causing deflection of circulating feed particles in the lower region of the chamber to increase residence time of the feed material in the chamber to further facilitate processing of the feed material.

19. The method of claim 18, including the step of recovering at least two graded streams of processed feed material having particles of different size or mass.

* * * * *